US010925351B2

(12) United States Patent
Moore

(10) Patent No.: US 10,925,351 B2
(45) Date of Patent: Feb. 23, 2021

(54) SHOE SIZERS FOR CHILDREN

(71) Applicant: Jill Moore, Cedar Park, TX (US)

(72) Inventor: Jill Moore, Cedar Park, TX (US)

( * ) Notice: Subject to any disclaimer, the term of this patent is extended or adjusted under 35 U.S.C. 154(b) by 190 days.

(21) Appl. No.: 16/170,326

(22) Filed: Oct. 25, 2018

(65) Prior Publication Data

US 2020/0128920 A1    Apr. 30, 2020

(51) Int. Cl.
*A43D 1/02* (2006.01)
*G09B 19/00* (2006.01)
*A43B 3/30* (2006.01)

(52) U.S. Cl.
CPC ............. *A43D 1/027* (2013.01); *G09B 19/00* (2013.01); *A43B 3/30* (2013.01)

(58) Field of Classification Search
CPC .......... A43B 3/30; A43D 1/027; G09B 19/00
USPC ........................................................ 33/512
See application file for complete search history.

(56) References Cited

U.S. PATENT DOCUMENTS

| | | | |
|---|---|---|---|
| 1,252,920 A | 1/1918 | Maine | |
| 3,359,640 A | 12/1967 | Kirkland | |
| 4,136,452 A * | 1/1979 | McMillan | A41H 3/08 33/17 R |
| 4,995,514 A * | 2/1991 | Forschner | A41H 3/08 206/574 |
| D366,624 S | 1/1996 | Collins | |
| 5,879,725 A | 3/1999 | Potter | |
| 5,914,659 A | 6/1999 | Herman et al. | |
| D419,080 S | 1/2000 | Panek | |
| 6,029,358 A | 2/2000 | Mathiasmeier et al. | |
| 6,055,738 A * | 5/2000 | Bardeen | B43L 13/203 206/575 |
| 7,069,665 B1 * | 7/2006 | Adriano | A43B 7/142 33/3 R |
| 7,121,019 B2 * | 10/2006 | Frederiksen | A43B 3/105 36/11.5 |
| 7,752,769 B1 * | 7/2010 | Cheh | G01B 3/14 33/512 |
| 7,770,301 B1 * | 8/2010 | Grandberry | G01B 3/004 33/494 |
| 7,854,071 B2 * | 12/2010 | Goonetilleke | A43D 1/02 33/3 R |

(Continued)

FOREIGN PATENT DOCUMENTS

| | | |
|---|---|---|
| GB | 2020832 A | 4/1979 |
| WO | WO2001/093712 | 12/2001 |
| WO | WO2006/052260 | 5/2006 |

*Primary Examiner* — Yaritza Guadalupe-McCall
(74) *Attorney, Agent, or Firm* — Loza & Loza LLP; Kevin L. Soules

(57) ABSTRACT

A child's shoe sizing kit, system, and method are disclosed. The kit includes a variety of shoe sizers, or cut out templates of a foot sized in a variety of sizes. The kit includes whole and half sizes shoe sizers for: Infant, Baby Walker, Toddler, Little Kid, and Big Kid. The kit would have the size on each sizer also marked with Left and Right. Each kit of sizers would come in a small clear carrying bag with handle for easy transport to stores. The child steps down on the sizers to determine which size the child's foot is. Select the sizer which fits the size and shape of the child's foot. Take the correct sizer that matches the child's foot and place it inside of a shoe. Place your hand in the shoe to feel where the sizer ends compared to where the shoe ends.

18 Claims, 9 Drawing Sheets

(56) References Cited

U.S. PATENT DOCUMENTS

| | | | | |
|---|---|---|---|---|
| 7,882,645 | B2* | 2/2011 | Boring | D05C 17/00 |
| | | | | 33/562 |
| D704,080 | S | 5/2014 | Carabajal et al. | |
| 2002/0035793 | A1* | 3/2002 | Byrd | A43B 3/0078 |
| | | | | 36/8.4 |
| 2012/0079738 | A1* | 4/2012 | Alberi | A43B 3/244 |
| | | | | 36/11.5 |
| 2015/0019372 | A1* | 1/2015 | Fox | A43B 3/122 |
| | | | | 705/26.5 |
| 2017/0231320 | A1* | 8/2017 | Nunez | A43B 17/14 |
| | | | | 36/93 |
| 2020/0128920 | A1* | 4/2020 | Moore | G09B 19/00 |

* cited by examiner

SHOE SIZERS FOR CHILDREN

TECHNICAL FIELD

Embodiments are generally related to shoe sizers for children. Embodiments are additionally related to a kit for determining a child's shoe size. Embodiments also relate to a method for determining the proper size of a child's foot.

BACKGROUND

Shoes sizes are not universal and vary from different manufacturers. Some manufacturers place emphasis on different anatomical measurements such as ball girth, instep, waist and length. Most manufacturers continue to use their own sizing scales, thus resulting in inconsistent and subjective shoe sizes.

An ideal fit cannot always be guaranteed by way of conventional shoe sizing scales. Most shoes are manufactured in mass quantities and shipped to stores that stock each shoe in a variety of sizes. At the store, the length and width of the wearer's foot is often measured with a Brannock shoe measurement tray to determine a nominal foot size. The Brannock shoe measurement device measures the length of the foot in half size increments, from size 1 to size 15½. Each half size increment is equal to ⅙". Width designations are provided on a scale of letters incremented by ⅙, e.g., AAA, AA, A, B, C, D, E, EE, and EEE. Moreover, shoes are conventionally sold in matched pairs, despite the fact that many people have differing sizes in their left and right feet. Any size provided by such a measuring device is an estimate and not standard across all shoes.

When the shoe wearer is a child, he or she often is unaware of proper shoe fit. Children often do not realize that they are wearing shoes that are too tight because they outgrow their shoes very quickly. Although parents may take their child to a shoe store to find larger shoes, the child does not always cooperate. It may take many attempts of trying various shoes before finding a properly fitting pair. When asked the subjective question—"how does that shoe fit?"—a child may respond with inaccurate information. The child may not have the experience to judge the proper fit of their shoes.

Children's feet can grow quickly and at an irregular rate. Shoes that once fit the child a few weeks or months ago may no longer fit them. Children's feet can sustain long-term damage by wearing improperly-fitted shoes. Often times, children are unaware their shoes no longer fit. They fail to tell their parents about the improper fit, instead opting to continue wearing the small shoes. It is problem for a parent to know when it is necessary to buy a larger pair of shoes for a child. Usually adults can determine the fit of their child's shoes by pressing the toe boxes to see if room exists in that area. This determination is often inaccurate especially with stiff shoes.

In failed attempts to address these issues, footwear designers try to improve the fit of footwear by providing customized footwear items. Some customizable footwear has been made using molds taken of the foot of the wearer. Producing a shoe from these molds is time-consuming, expensive, and often results in shoes that are too tight. Another type of customizable footwear approach has been developed using digital imaging technology, which requires expensive and highly-specialized equipment that is not available to the general public. It is a principal object of the present invention to provide a system and method for fitting footwear that avoids the drawbacks of these approaches.

Accordingly, the present invention provides a shoe sizing kit, system, and method which serves as an objective guide to a child's foot size for proper shoe fitting.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, an aspect of the disclosed embodiments to provide shoe sizers for children.

In addition, it is aspect of the embodiments to provide a kit for determining a child's shoe size.

It is another aspect of the disclosed embodiments to provide a method for determining the proper size of a child's foot.

The aforementioned aspects and other objectives and advantages can now be achieved as described herein. In the disclosed embodiments, a child's shoe sizing kit, system, and method are disclosed. The kit includes a variety of shoe sizers, or cut out templates of a foot sized in a variety of sizes. The kit includes whole and half sizes shoe sizers for: Infant, Baby Walker, Toddler, Little Kid, and Big Kid. The kit would have the size on each sizer also marked with Left and Right. Each kit of sizers would come in a small clear carrying bag with handle for easy transport to stores. The child steps down on the sizers to determine which size the child's foot is. Select the sizer which fits the size and shape of the child's foot. Take the correct sizer that matches the child's foot and place it inside of a shoe. Place your hand in the shoe to feel where the sizer ends compared to where the shoe ends.

In one aspect, a shoe sizing kit is disclosed. The shoe sizing kit comprises: a plurality of shoe sizers shaped in a plurality of shoe sizes and shaped to size a foot; instructions for using the plurality of shoe sizers; and a carrying container for the plurality of shoe sizers and the instructions. In yet another aspect, the plurality of shoe sizers are shaped to measure a foot size of a child.

In other aspects, the plurality of shoe sizers comprises seven sizers, wherein the plurality of shoe sizers are shaped to measure a foot size of an infant, wherein the plurality of shoe sizers are shaped in infant shoe sizes: 0, 1, 1.5, 2, 2.5, 3, 3.5. In an aspect, the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7. In some aspects, the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12. In another aspect, the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3. In other aspects, the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

In yet another aspect, the plurality of shoe sizers are marked on one side with "Left" to measure a left foot; and the plurality of shoe sizers are marked on one side with "Right" to measure a right foot. In other aspects, the plurality of sizers comprise at least one of: foam, foam rubber, polymer, plastic, or paper. In some aspects, the instructions for using the plurality of shoe sizers advise: select one of the plurality of sizers that corresponds to a size of a right foot of a child; have the child step down with the right foot on one of the plurality of sizers to determine a size of the right foot of the child; turn over the one of the plurality of sizers to measure a left foot or select another one of the plurality of sizers that corresponds to a size of the left foot of the child; have the child step down with the left foot on one of the plurality of sizers to determine a size of the left foot of the child; insert the selected one of the plurality of sizers into a shoe to determine if the shoe fits the right foot of the child, wherein the shoe fits the right foot if the selected one of the plurality of sizers does not touch the end of the shoe; insert the selected one of the plurality of sizers into a shoe to determine if the shoe fits the left foot of the child, wherein the shoe fits the left foot if the selected one of the plurality of sizers does not touch the end of the shoe; select the shoe for the right foot if the one of the plurality of sizes fits with space between the one of the plurality of sizers and the end of the shoe; and select the shoe for the left foot if the one of the plurality of sizes fits with space between the one of the plurality of sizers and the end of the shoe.

In another aspect, the carrying container comprises a package, a plastic bag, a box, or a bag with a handle.

In an aspect, a shoe sizing system comprises: a plurality of shoe sizers shaped in a plurality of shoe sizes and shaped to size a foot a plurality of shoe sizers shaped in a plurality of shoe sizes and shaped to size a foot of a child; and a shoe that receives one of the plurality of shoe sizers when inserted into the shoe, wherein the one of the plurality of shoe sizers corresponds to a size of a foot of the child and correctly determines if the shoe fits the foot of the child.

In some aspects, the plurality of shoe sizers comprises seven sizers, wherein the plurality of shoe sizers shaped to measure a foot size of an infant, wherein the plurality of shoe sizers are shaped in infant shoe sizes: 0, 1, 1.5, 2, 2.5, 3, 3.5. In another aspect, the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7. In other aspects, the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12. In yet another aspect, the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3. In other aspects, the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

In other aspects, the plurality of shoe sizers are marked on one side with "Left" to measure a left foot; the plurality of shoe sizers are marked on one side with "Right" to measure a right foot; and the plurality of sizers comprise at least one of: foam, foam rubber, polymer, plastic, or paper.

In an aspect, a shoe sizing method is disclosed. The method comprises: selecting one of the plurality of sizers that corresponds to a size of a right foot of a child; having the child step down with the right foot on one of the plurality of sizers to determine a size of the right foot of the child; turning over the one of the plurality of sizers to measure a left foot or select another one of the plurality of sizers that corresponds to a size of the left foot of the child; and having the child step down with the left foot on one of the plurality of sizers to determine a size of the left foot of the child.

In another aspect, the method comprises: inserting the selected one of the plurality of sizers into a shoe to determine if the shoe fits the right foot of the child, wherein the shoe fits the right foot if the selected one of the plurality of sizers does not reach a toe touch the end of the shoe; inserting the selected one of the plurality of sizers into a shoe to determine if the shoe fits the left foot of the child, wherein the shoe fits the left foot if the selected one of the plurality of sizers does not touch the end of the shoe; selecting the shoe for the right foot if the one of the plurality of sizes fits within the shoe with space between the one of the plurality of sizers and the end of the shoe; and selecting the shoe for the left foot if the one of the plurality of sizes fits within the shoe with space between the one of the plurality of sizers and the end of the shoe.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term one or more as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
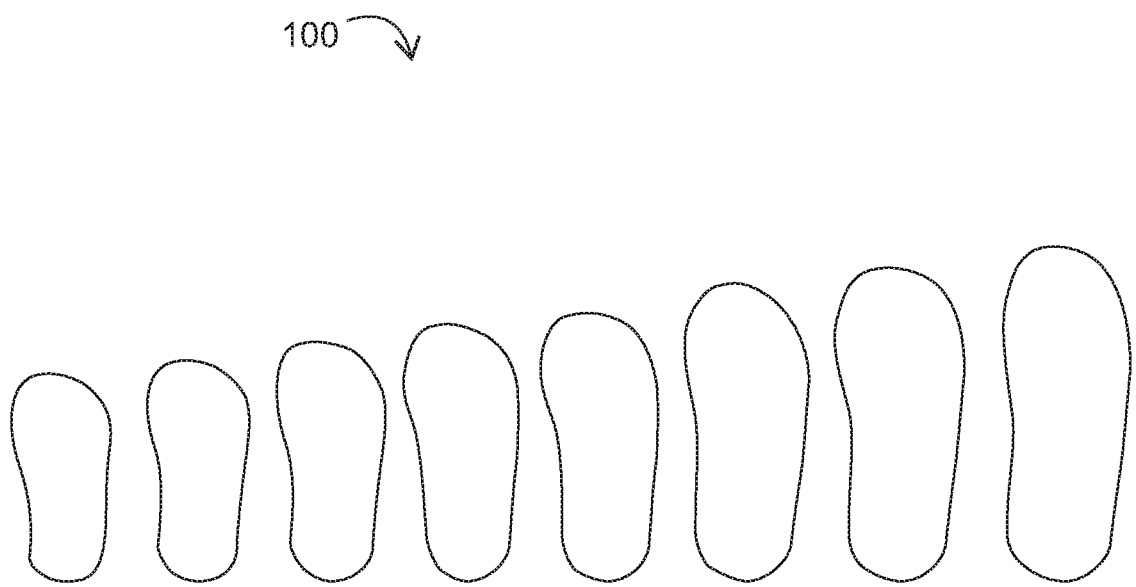
FIG. 1 illustrates a variety of shoe sizers 100, which can be implemented in accordance with an example embodiment.
Figure 2:
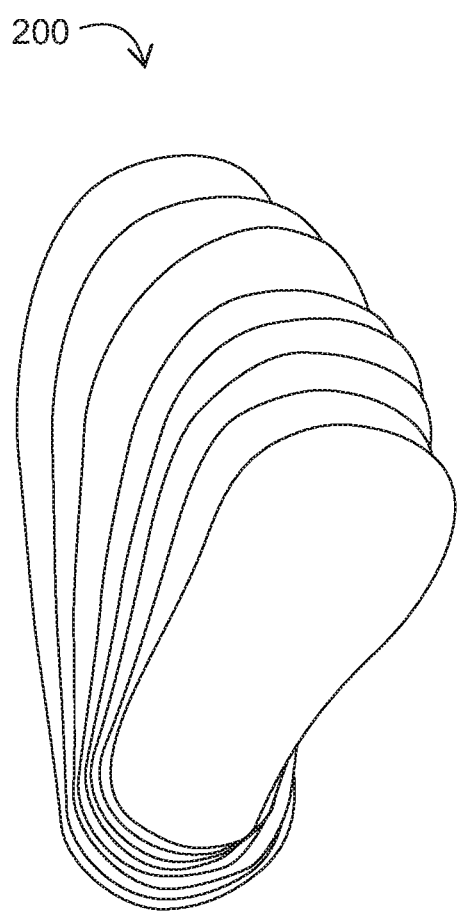
FIG. 2 illustrates a collection of shoe sizers 200 for inclusion in a shoe sizing kit, in accordance with an example embodiment.
Figure 3:
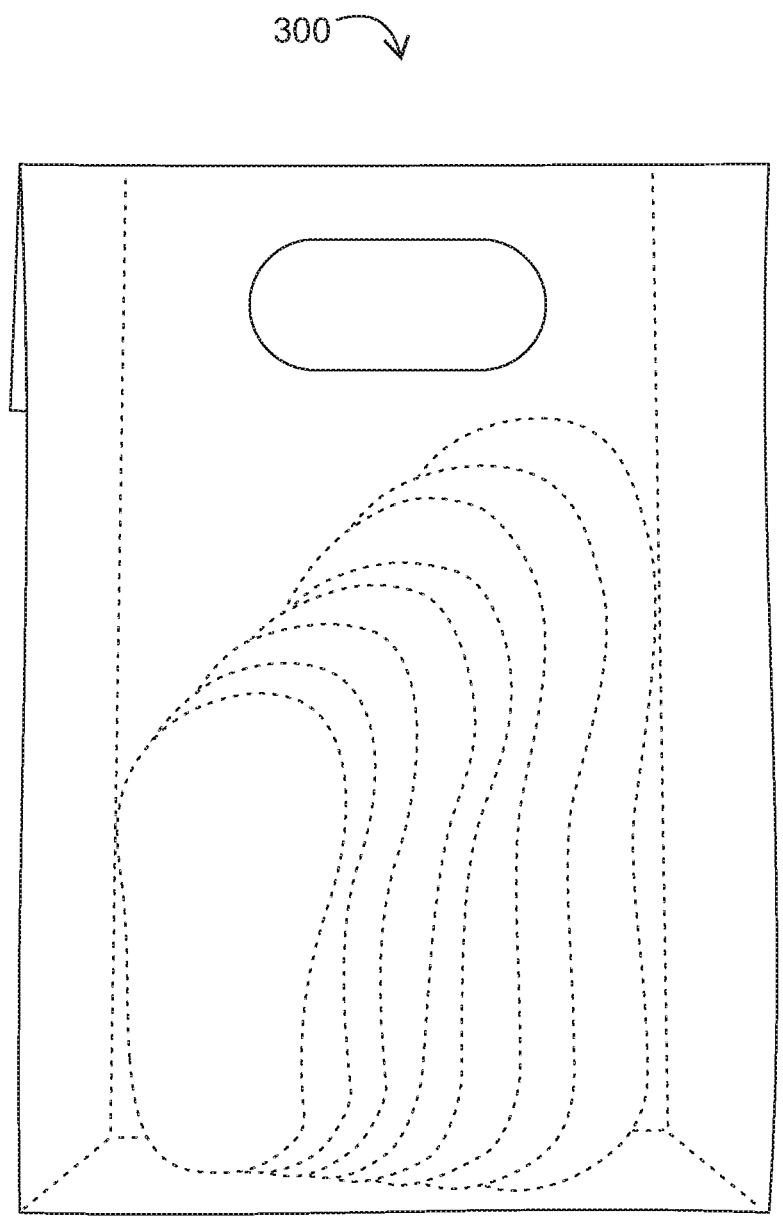
FIG. 3 illustrates the shoe sizer kit 300, in accordance with an example embodiment.
Figure 4:
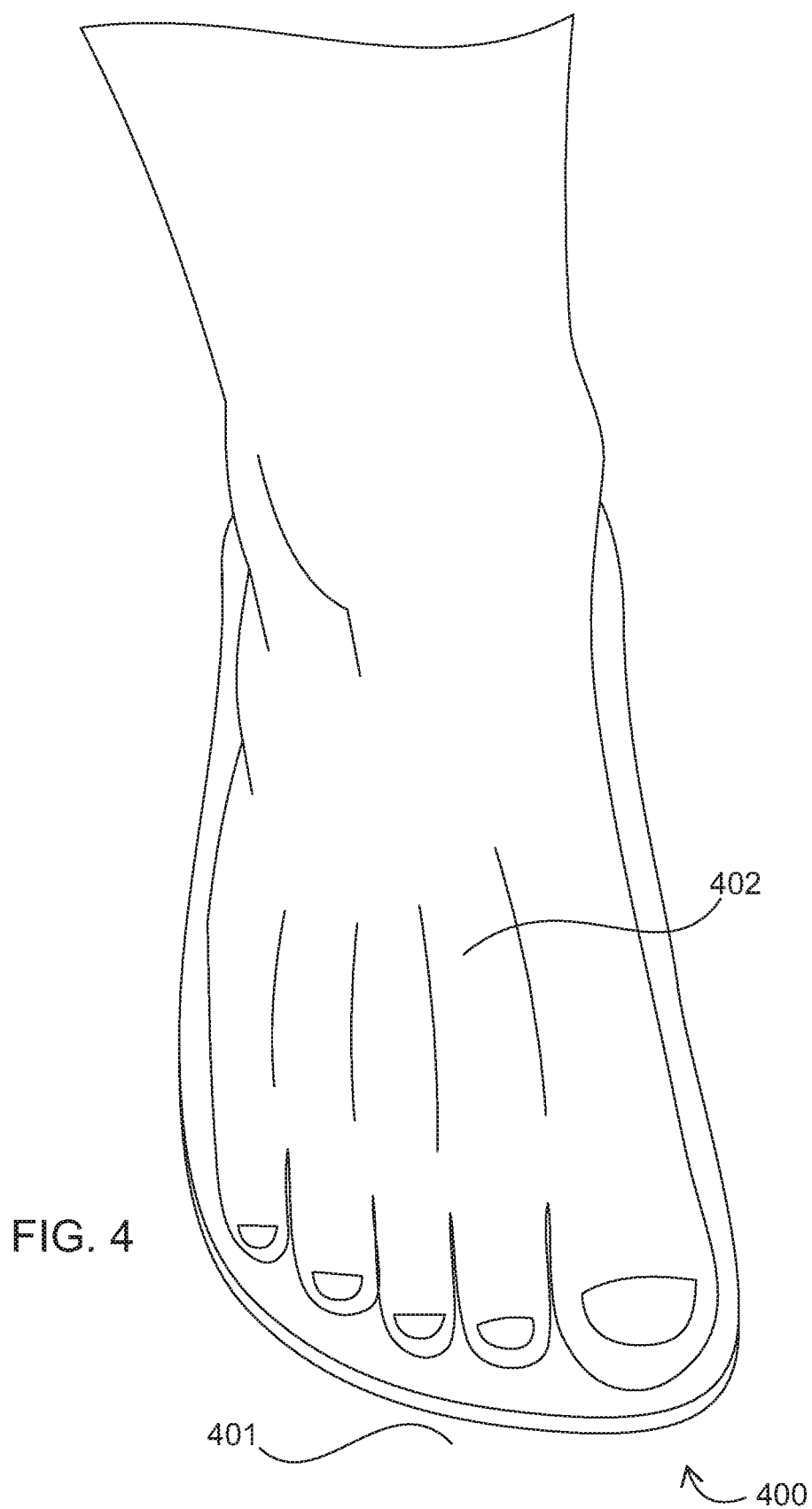
FIG. 4 illustrates the method of using 400 the shoe sizer kit, in accordance with an example embodiment.
Figure 5:
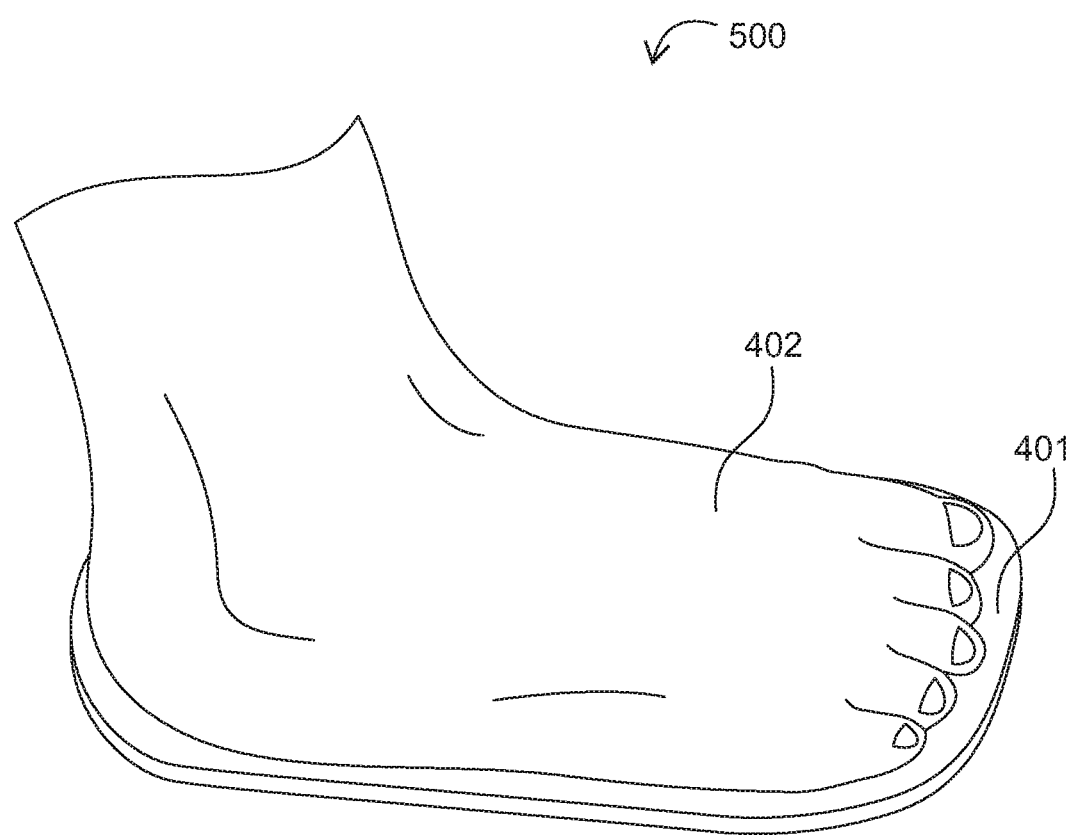
FIG. 5 illustrates the method of using 500 the shoe sizer kit, in accordance with an example embodiment.

The disclosed shoe sizing kit, system, and method helps size a child's foot. The kit includes: shoe sizers 100 (as shown in FIG. 1) in a variety of shoe sizes along with instructions on properly sizing a child's foot. The shoe sizers 100 can be constructed of durable material such as, for example, foam, foam rubber, polymer, plastic, or paper. This shoe sizing kit comes in five packages with all whole and half sizes in each package. The kit includes shoe sizers 200 (as shown in FIG. 2) for: Infant, Baby Walker, Toddler, Little Kid, and Big Kid. Sizes for Infant sizers include (United States Sizes): 0, 1, 1.5, 2, 2.5, 3, 3.5. Sizes for Baby Walker sizers include (United States Sizes): 4, 4.5, 5, 5.5, 6, 6.5, 7. Sizes for Toddler sizers include (United States Sizes): 7, 7.5, 8, 8.5, 9, 9.5, 10, 10.5, 11, 11.5, 12. Sizes for Little Kid sizers include (United States Sizes): 12, 12.5, 1, 1.5, 2, 2.5, 3. Sizes for Big Kid sizers include (United States Sizes): 3, 3.5, 4, 4.5, 5, 5.5, 6, 6.5, 7. The kit would have the size on each sizer also marked with L (Left) and R (Right). Each kit of sizers 300 would come in a carrying container, preferably a small clear carrying bag with handle for easy transport to stores, as illustrated in FIG. 3. The carrying container can also include: a package, a plastic bag, a box, or a bag with a handle.

A parent or anyone who wishes to size a child's foot can purchase a kit 300 with the appropriate sizers included. The instructions for the shoe sizing kit describe the following process, as illustrated in methods 400-900 illustrated in FIGS. 4-9 included herein.

Remove sizers 200 from packaging. Start with the largest sizer 200 first and work your way down in size. Place a sizer 401 on the floor and have your child step on the sizer 401 (as illustrated in methods 400 and 500 in FIGS. 4 and 5, respectively), lining their foot 402 up with the heal first and see where your child's big toe ends on the sizer 401. If the sizer 401 is too big, then repeat the process until your child's big toe is close enough to the end of the sizer 401. Allow a small space on the end of the sizer 401 at the big toe but not too much space to wear if the sizer 401 is too large. The best fit of a particular sizer 401 would be to have the big toe ½ an inch from the top of the sizer 401 while standing on it upright with the foot 402.

Figure 6:
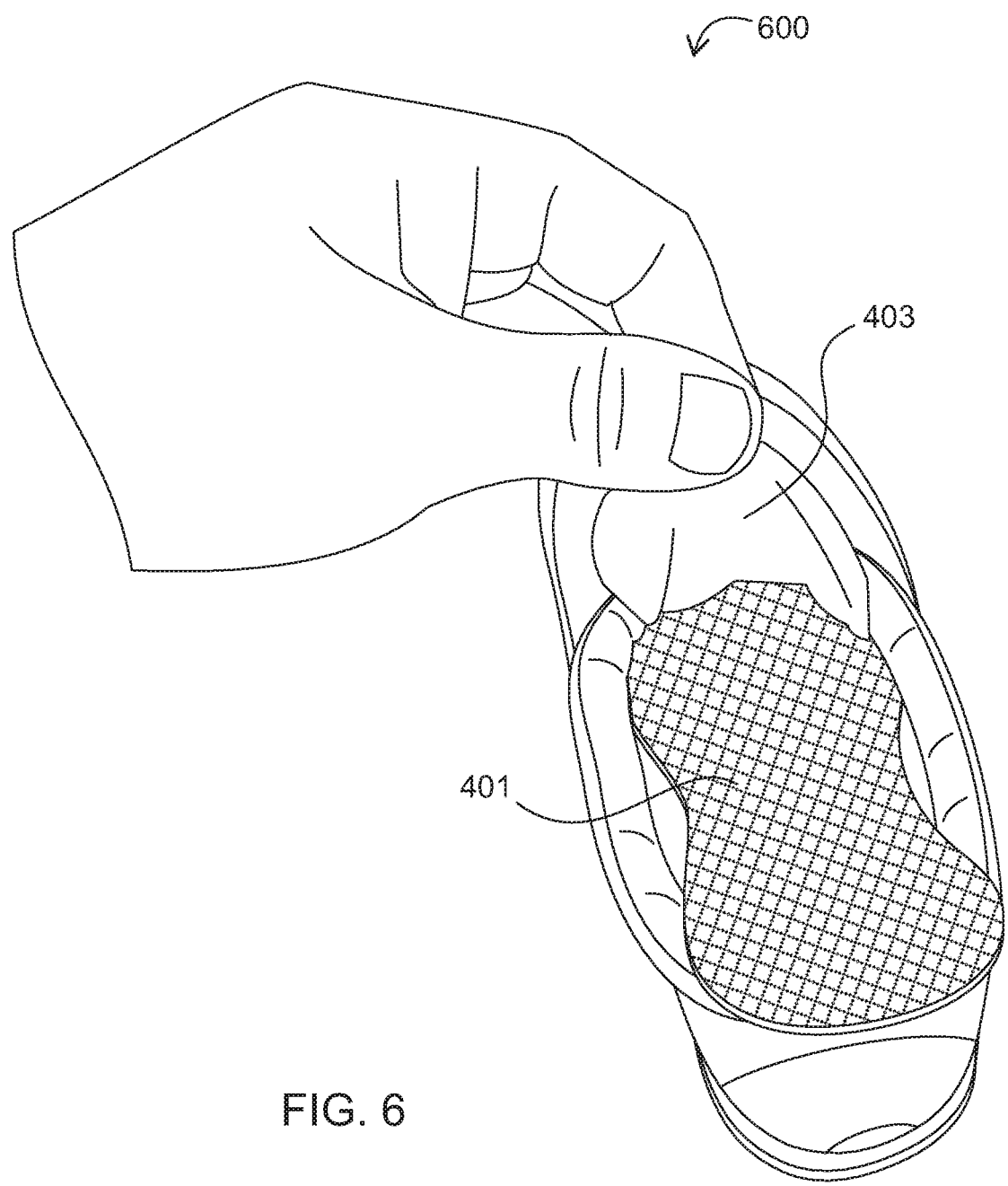
FIG. 6 illustrates the method of using 600 the shoe sizer kit, in accordance with an example embodiment.
Figure 7:
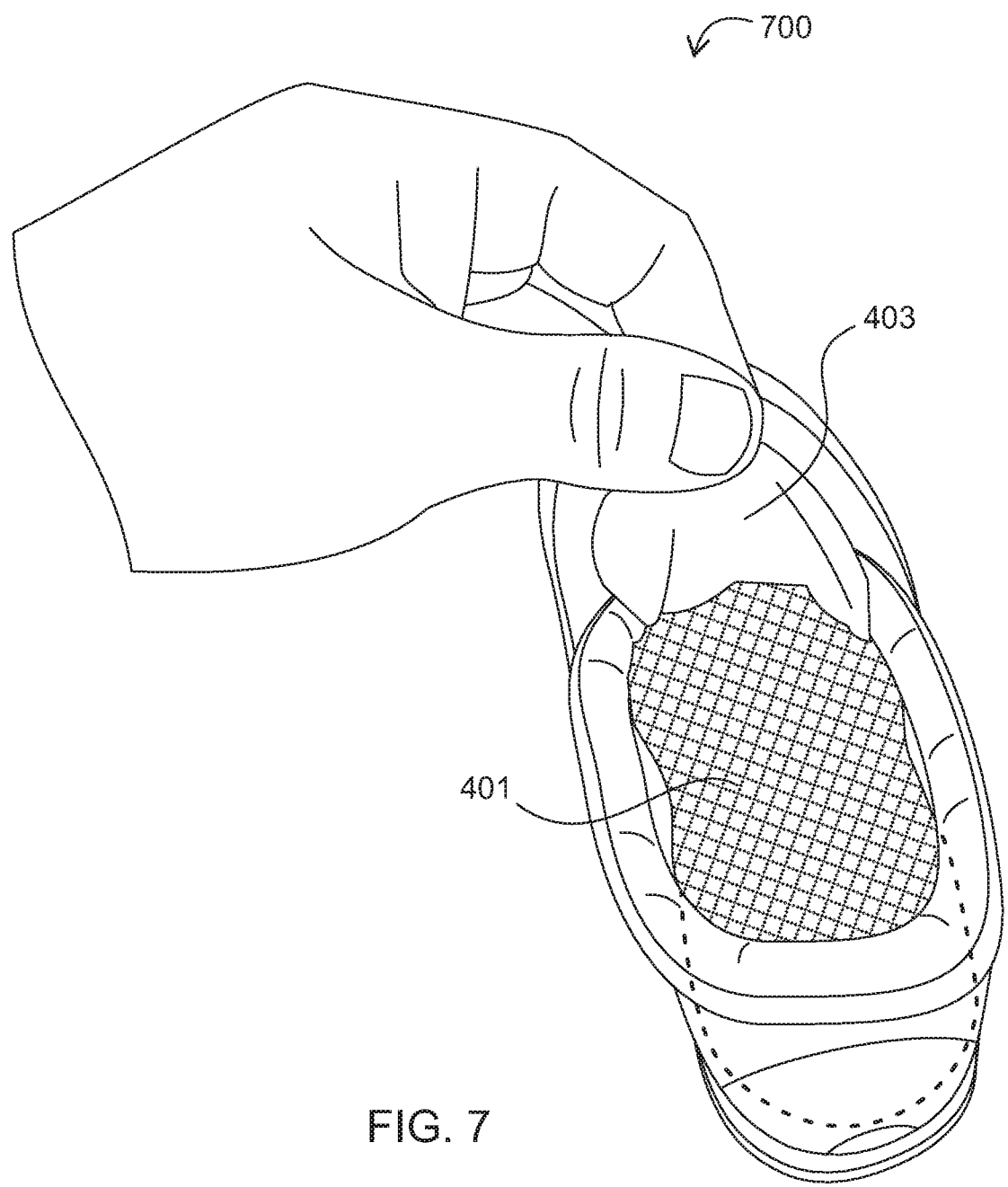
FIG. 7 illustrates the method of using 700 the shoe sizer kit, in accordance with an example embodiment.
Figure 8:
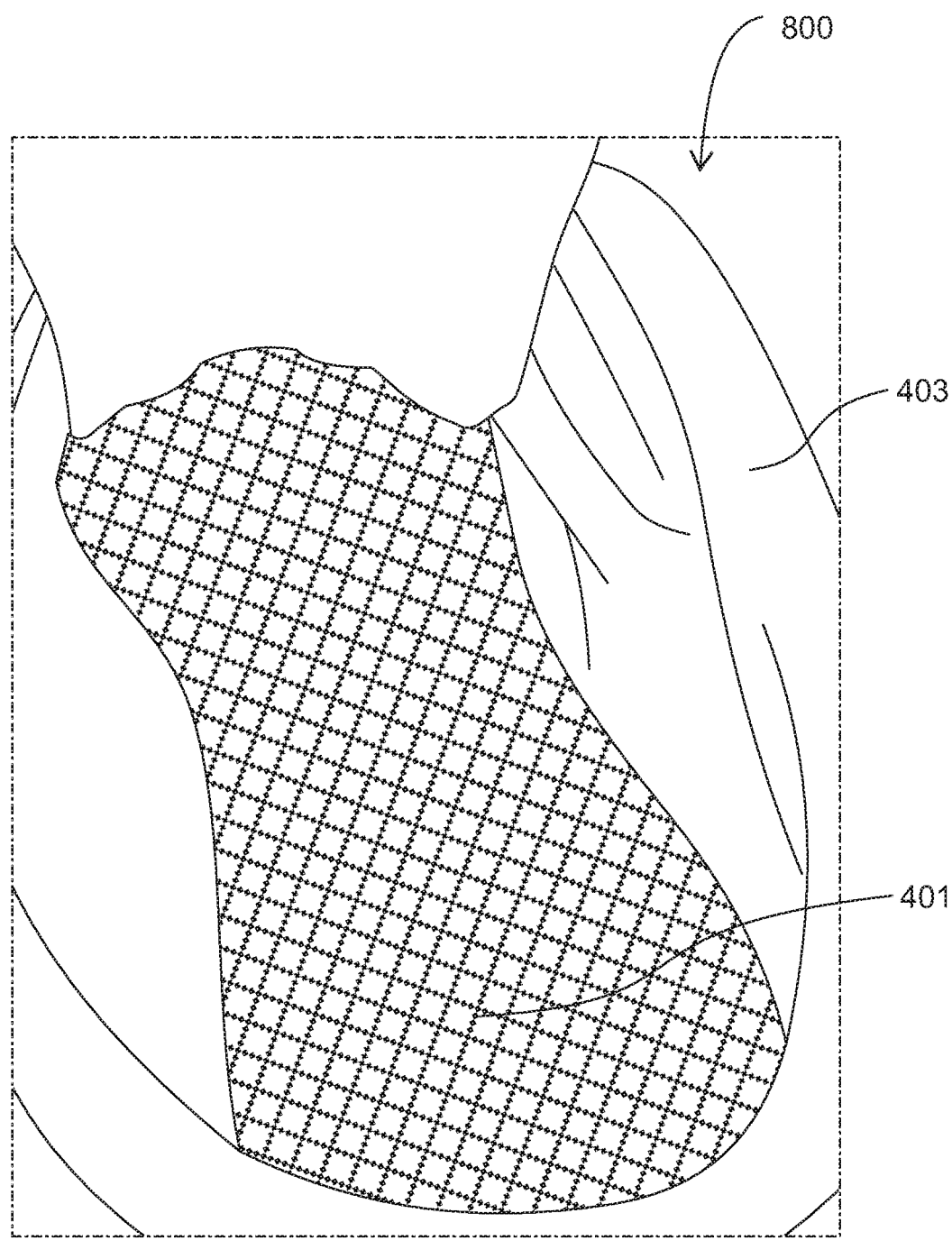
FIG. 8 illustrates the method of using 800 the shoe sizer kit, in accordance with an example embodiment.
Figure 9:
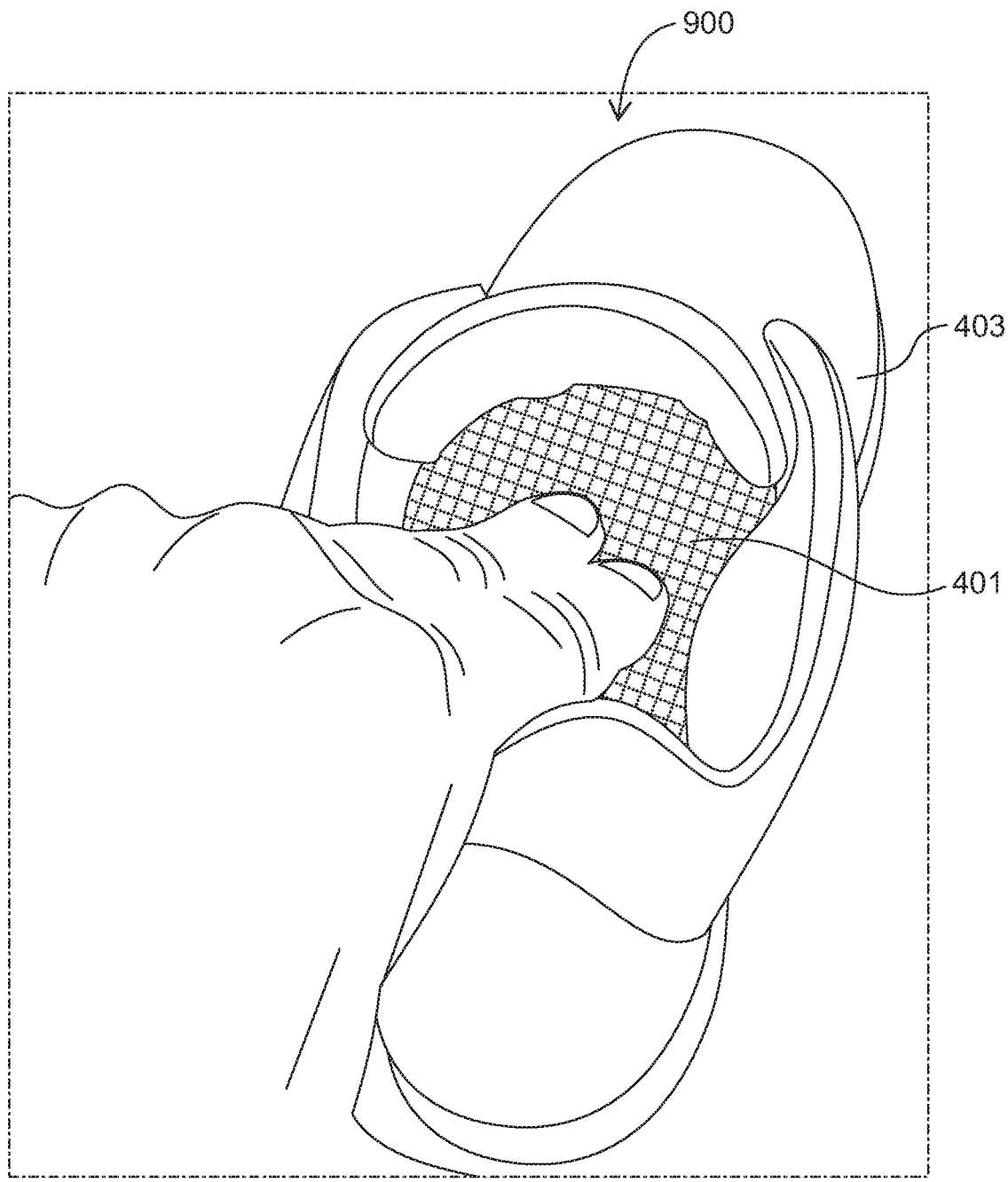
FIG. 9 illustrates the method of using 900 the shoe sizer kit, in accordance with an example embodiment.

Once the correct size of sizer 401 is chosen, take this sizer 401 to the store(s) and place it into the shoe 403 you are looking to purchase (as illustrated in methods 600, 700, and 800 in FIGS. 6, 7, and 8, respectively). Place your hand in the shoe 403 and feel where the sizer 401 ends (as illustrated in method 900 in FIG. 9). If the sizer 401 is too big for the shoe 403 or is touching the end of the inside of the shoe 403 by the toe area, then that size shoe 403 is not going to fit your child's foot 401. If the insert has a preferable ½ an inch space before touching the end of the shoe 403 by the toe area that you are looking to purchase, then that is the correct size shoe 403 that will fit your child's foot 401. (NOTE: This Children's Shoe Sizer only sizes that length of your child's foot. It does not claim to measure the height or width of your child's foot. The disclosed embodiments measure length of the child's foot only and does not serve as an insole.)

This sizer 401 can also be used to measure current shoes your child(s) is wearing. One cannot always rely on children to tell when their toes are touching the end of their shoes. While following these same procedures above, one can determine if a child's current shoe(s) they are wearing are still the correct size or if you need to purchase new ones. The health of your child's foot for its natural growth is important and shoes should be checked regularly to prevent non-toe growth in your child(s) feet.

The inventor is the mother of two children, ages 4 and 9. The inventor struggles when it comes to buying her children new shoes. The appropriate size of her children's shoes is always a guessing game. She cannot rely on her children to be honest when she asks them, "Does that fit?" or "Is your toe touching?" Shoe buying for kids is daunting and most parents do not want to take their kids shoe shopping.

With the disclosed Children's Shoe Sizer, this takes the guess work out of buying shoes. Not all brands sizing are the same; some run too large or too small. Since every shoe cannot have a see through window to view the toes and we cannot rely on a child's judgment, this invention also prevents injury and non-growth to a child's growing foot. A user of the disclosed kit can size not only new shoes but check current shoes they are wearing as well.

Based on the foregoing, it can be appreciated that a number of embodiments, preferred and alternative, are disclosed herein. In an embodiment, a shoe sizing kit is disclosed. The shoe sizing kit comprises: a plurality of shoe sizers shaped in a plurality of shoe sizes and shaped to size a foot; instructions for using the plurality of shoe sizers; and a carrying container for the plurality of shoe sizers and the instructions. In yet another embodiment, the plurality of shoe sizers are shaped to measure a foot size of a child.

In other embodiments, the plurality of shoe sizers comprises seven sizers, wherein the plurality of shoe sizers are shaped to measure a foot size of an infant, wherein the plurality of shoe sizers are shaped in infant shoe sizes: 0, 1, 1.5, 2, 2.5, 3, 3.5. In an embodiment, the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7. In some embodiments, the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12. In another embodiment, the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3. In other embodiments, the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

In yet another embodiment, the plurality of shoe sizers are marked on one side with "Left" to measure a left foot; and the plurality of shoe sizers are marked on one side with "Right" to measure a right foot. In other embodiments, the plurality of sizers comprise at least one of: foam, foam rubber, polymer, plastic, or paper. In some embodiments, the instructions for using the plurality of shoe sizers advise: select one of the plurality of sizers that corresponds to a size of a right foot of a child; have the child step down with the right foot on one of the plurality of sizers to determine a size of the right foot of the child; turn over the one of the plurality of sizers to measure a left foot or select another one of the plurality of sizers that corresponds to a size of the left foot of the child; have the child step down with the left foot on one of the plurality of sizers to determine a size of the left foot of the child; insert the selected one of the plurality of sizers into a shoe to determine if the shoe fits the right foot of the child, wherein the shoe fits the right foot if the selected one of the plurality of sizers does not touch the end of the shoe; insert the selected one of the plurality of sizers into a shoe to determine if the shoe fits the left foot of the child, wherein the shoe fits the left foot if the selected one of the plurality of sizers does not touch the end of the shoe; select the shoe for the right foot if the one of the plurality of sizes fits with space between the one of the plurality of sizers and the end of the shoe; and select the shoe for the left foot if the one of the plurality of sizes fits with space between the one of the plurality of sizers and the end of the shoe.

In another embodiment, the carrying container comprises a package, a plastic bag, a box, or a bag with a handle.

In an embodiment, a shoe sizing system comprises: a plurality of shoe sizers shaped in a plurality of shoe sizes and shaped to size a foot a plurality of shoe sizers shaped in a plurality of shoe sizes and shaped to size a foot of a child; and a shoe that receives one of the plurality of shoe sizers when inserted into the shoe, wherein the one of the plurality of shoe sizers corresponds to a size of a foot of the child and correctly determines if the shoe fits the foot of the child.

In some embodiments, the plurality of shoe sizers comprises seven sizers, wherein the plurality of shoe sizers shaped to measure a foot size of an infant, wherein the plurality of shoe sizers are shaped in infant shoe sizes: 0, 1, 1.5, 2, 2.5, 3, 3.5. In another embodiment, the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7. In other embodiments, the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12. In yet another embodiment, the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3. In other embodiments, the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

In other embodiments, the plurality of shoe sizers are marked on one side with "Left" to measure a left foot; the plurality of shoe sizers are marked on one side with "Right" to measure a right foot; and the plurality of sizers comprise at least one of: foam, foam rubber, polymer, plastic, or paper.

In an embodiment, a shoe sizing method is disclosed. The method comprises: selecting one of the plurality of sizers that corresponds to a size of a right foot of a child; having the child step down with the right foot on one of the plurality of sizers to determine a size of the right foot of the child; turning over the one of the plurality of sizers to measure a left foot or select another one of the plurality of sizers that corresponds to a size of the left foot of the child; and having the child step down with the left foot on one of the plurality of sizers to determine a size of the left foot of the child.

In another embodiment, the method comprises: inserting the selected one of the plurality of sizers into a shoe to determine if the shoe fits the right foot of the child, wherein the shoe fits the right foot if the selected one of the plurality of sizers does not touch the end of the shoe; inserting the selected one of the plurality of sizers into a shoe to determine if the shoe fits the left foot of the child, wherein the shoe fits the left foot if the selected one of the plurality of sizers does not touch the end of the shoe; selecting the shoe for the right foot if the one of the plurality of sizes fits within the shoe with space between the one of the plurality of sizers and the end of the shoe; and selecting the shoe for the left foot if the one of the plurality of sizes fits within the shoe with space between the one of the plurality of sizers and the end of the shoe.

It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

What is claimed is:
1. A shoe sizing kit comprising:
   a plurality of shoe sizers shaped in a plurality of shoe sizes and shaped to size a foot;
   instructions for using the plurality of shoe sizers, wherein the instructions for using the plurality of shoe sizers advise:
      select one of the plurality of sizers that corresponds to a size of a right foot of a child;
      have the child step down with the right foot on one of the plurality of sizers to determine a size of the right foot of the child;
      turn over the one of the plurality of sizers to measure a left foot or select another one of the plurality of sizers that corresponds to a size of the left foot of the child;
      have the child step down with the left foot on one of the plurality of sizers to determine a size of the left foot of the child;
      insert the selected one of the plurality of sizers into a shoe to determine if the shoe fits the right foot of the child, wherein the shoe fits the right foot if the selected one of the plurality of sizers does not touch the end of the shoe;

insert the selected one of the plurality of sizers into a shoe to determine if the shoe fits the left foot of the child, wherein the shoe fits the left foot if the selected one of the plurality of sizers does not touch the end of the shoe;

select the shoe for the right foot if the one of the plurality of sizes fits within the shoe with space between the one of the plurality of sizers and the end of the shoe; and select the shoe for the left foot if the one of the plurality of sizes fits within the shoe with space between the one of the plurality of sizers and the end of the shoe; and a carrying container for the plurality of shoe sizers and the instructions.

2. The shoe sizing kit of claim 1 wherein the plurality of shoe sizers are shaped to measure a foot size of a child.

3. The shoe sizing kit of claim 1 wherein the plurality of shoe sizers comprises seven sizers, wherein the plurality of shoe sizers are shaped to measure a foot size of an infant, wherein the plurality of shoe sizers are shaped in infant shoe sizes: 0, 1, 1.5, 2, 2.5, 3, 3.5.

4. The shoe sizing kit of claim 1 wherein the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7.

5. The shoe sizing kit of claim 1 wherein the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12.

6. The shoe sizing kit of claim 1 wherein the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3.

7. The shoe sizing kit of claim 1 wherein the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

8. The shoe sizing kit of claim 1 wherein:
the plurality of shoe sizers are marked on one side with "Left" to measure a left foot; and
the plurality of shoe sizers are marked on one side with "Right" to measure a right foot.

9. The shoe sizing kit of claim 1 wherein the plurality of sizers comprise at least one of: foam, foam rubber, polymer, plastic, or paper.

10. The shoe sizing kit of claim 1 wherein the carrying container comprises a package, a plastic bag, a box, or a bag with a handle.

11. A shoe sizing system comprising:
a plurality of shoe sizers shaped in a plurality of shoe sizes and shaped to size a foot a plurality of shoe sizers shaped in a plurality of shoe sizes and shaped to size a foot of a child;
a shoe that receives one of the plurality of shoe sizers when inserted into the shoe, wherein the one of the plurality of shoe sizers corresponds to a size of a foot of the child and correctly determines if the shoe fits the foot of the child; and instructions for using the plurality of shoe sizers, wherein the instructions for using the plurality of shoe sizers advise:

select one of the plurality of sizers that corresponds to a size of a right foot of a child;

have the child step down with the right foot on one of the plurality of sizers to determine a size of the right foot of the child;

turn over the one of the plurality of sizers to measure a left foot or select another one of the plurality of sizers that corresponds to a size of the left foot of the child;

have the child step down with the left foot on one of the plurality of sizers to determine a size of the left foot of the child;

insert the selected one of the plurality of sizers into the shoe to determine if the shoe fits the right foot of the child, wherein the shoe fits the right foot if the selected one of the plurality of sizers does not touch the end of the shoe;

insert the selected one of the plurality of sizers into the shoe to determine if the shoe fits the left foot of the child, wherein the shoe fits the left foot if the selected one of the plurality of sizers does not touch the end of the shoe:

select the shoe for the right foot if the one of the plurality of sizes fits within the shoe with space between the one of the plurality of sizers and the end of the shoe; and select the shoe for the left foot if the one of the plurality of sizes fits within the shoe with space between the one of the plurality of sizers and the end of the shoe.

12. The shoe sizing system of claim 11 wherein: the plurality of shoe sizers comprises seven sizers, wherein the plurality of shoe sizers shaped to measure a foot size of an infant, wherein the plurality of shoe sizers are shaped in infant shoe sizes: 0, 1, 1.5, 2, 2.5, 3, 3.5.

13. The shoe sizing system of claim 11 wherein the plurality of shoe sizers comprises seven sizers, wherein the plurality of shoe sizers are shaped to measure a foot size of a baby walker, wherein the plurality of shoe sizers are shaped in baby walker shoe sizes: 4, 4.5, 5, 5.5, 6, 6.5, 7.

14. The shoe sizing system of claim 11 wherein the plurality of shoe sizers comprises eleven sizers, wherein the plurality of shoe sizers are shaped to measure a foot size of a toddler, wherein the plurality of shoe sizers are shaped in toddler shoe sizes: 7, 7.5, 8, 8.5, 9, 9.5, 10, 10.5, 11, 11.5, 12.

15. The shoe sizing system of claim 11 wherein the plurality of shoe sizers comprises seven sizers, wherein the plurality of shoe sizers are shaped to measure a foot size of a little kid, wherein the plurality of shoe sizers are shaped in little kid shoe sizes: 12, 12.5, 1, 1.5, 2, 2.5, 3.

16. The shoe sizing system of claim 11 wherein the plurality of shoe sizers comprises nine sizers, wherein the plurality of shoe sizers are shaped to measure a foot size of a big kid, wherein the plurality of shoe sizers are shaped in big kid shoe sizes: 3, 3.5, 4, 4.5, 5, 5.5, 6, 6.5, 7.

17. The shoe sizing system of claim 11 wherein:
the plurality of shoe sizers are marked on one side with "Left" to measure a left foot;
the plurality of shoe sizers are marked on one side with "Right" to measure a right foot; and
the plurality of sizers comprise at least one of: foam, foam rubber, polymer, plastic, or paper.

18. A shoe sizing method comprising:
- selecting one of the plurality of sizers that corresponds to a size of a right foot of a child;
- having the child step down with the right foot on one of the plurality of sizers to determine a size of the right foot of the child;
- turning over the one of the plurality of sizers to measure a left foot or select another one of the plurality of sizers that corresponds to a size of the left foot of the child;
- having the child step down with the left foot on one of the plurality of sizers to determine a size of the left foot of the child;
- inserting the selected one of the plurality of sizers into a shoe to determine if the shoe fits the right foot of the child, wherein the shoe fits the right foot if the selected one of the plurality of sizers does not touch the end of the shoe;
- inserting the selected one of the plurality of sizers into a shoe to determine if the shoe fits the left foot of the child, wherein the shoe fits the left foot if the selected one of the plurality of sizers does not touch the end of the shoe;
- selecting the shoe for the right foot if the one of the plurality of sizes fits within the shoe with space between the one of the plurality of sizers and the end of the shoe; and
- selecting the shoe for the left foot if the one of the plurality of sizes fits within the shoe with space between the one of the plurality of sizers and the end of the shoe.

* * * * *